Patented July 25, 1950

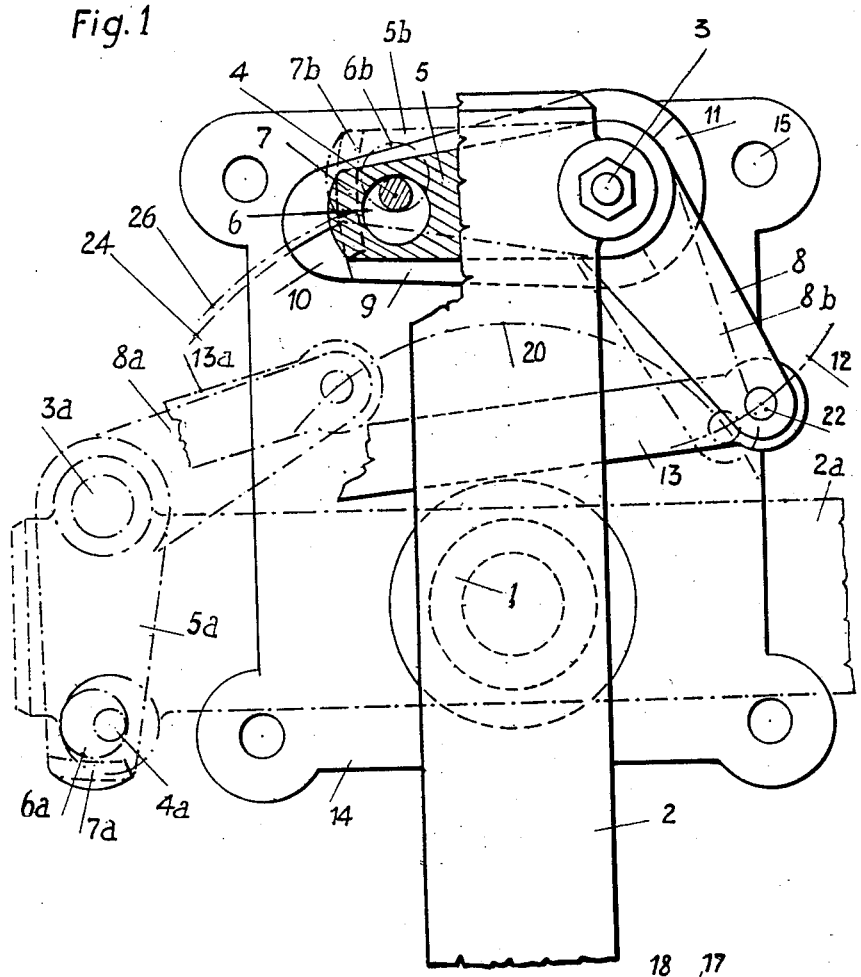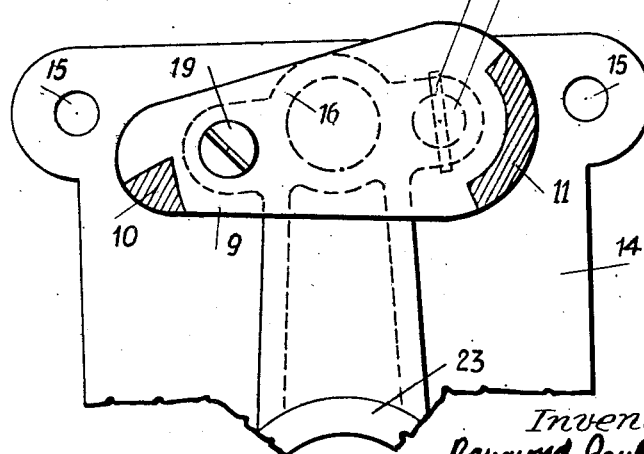

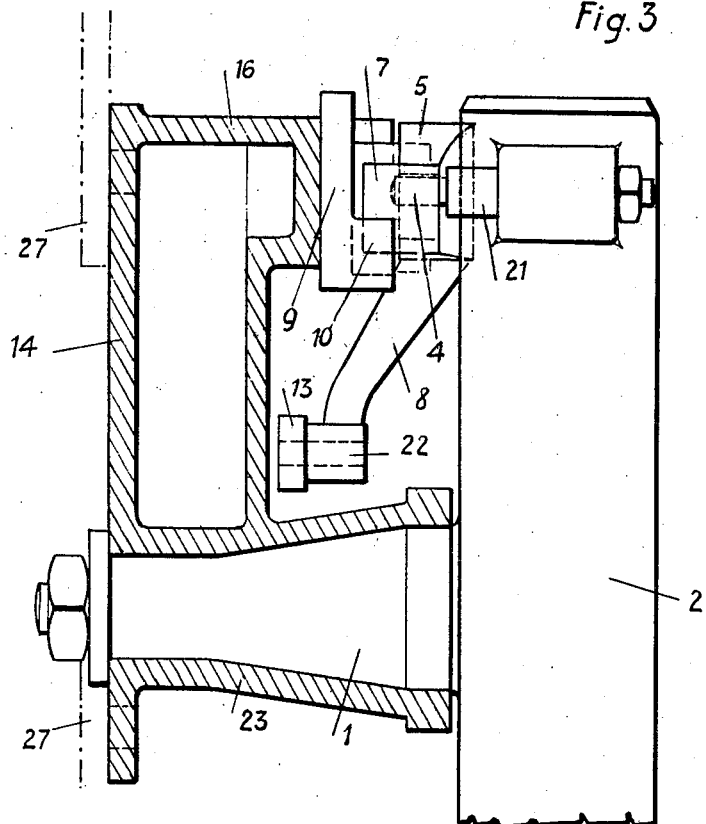
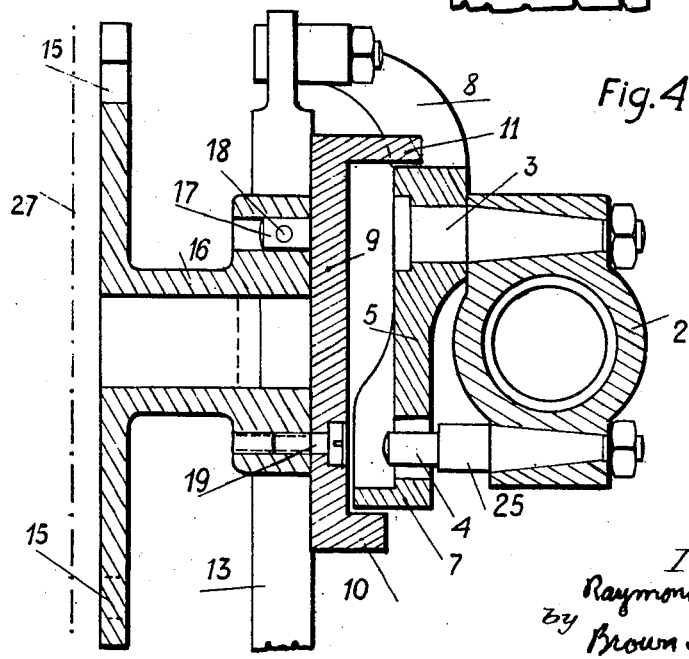

2,516,345

UNITED STATES PATENT OFFICE 2,516,345

LANDING GEAR FOR AIRCRAFT

Raymond Saulnier, Paris, France

Application June 29, 1946, Serial No. 680,399
In France March 7, 1946

4 Claims. (Cl. 244—102)

The present invention relates to landing-gears and has for its object a gear that can be assembled easily and that allows the retraction, the dropping of the gear and its locking in the landing position in an efficient manner and with greatly decreased overall dimensions.

According to the invention, the movable strut that carries the wheel is hinged to a fixed axis at an intermediate point of its length, located most suitably close to the upper end of the strut. This end carries a hinge joint on which can swivel a bell-crank lever, one of the ends of which is connected with the end of a tension rod actuated by any suitable control device while its other end is arranged so as to act in combination with a fixed stop. Moreover, this end of the bell-crank shows an opening in which is engaged a projection carried by the movable strut so as to be capable of taking a turning motion in relation to the strut through a limited length. Finally, provision is made for a second fixed stop offering an arcuate surface, against which the central part of the bell-crank bears.

With this arrangement, when the landing gear is dropped, the bell-crank is engaged between the two stops, and this holds the strut locked in the landing position. In order to raise the landing gear, the pilot pulls on the free end of the bell-crank which results in making it swivel round its hinge point with the movable strut while resting on the arcuate stop until its end, engaged behind the main stop, is released: at this point the edge of the opening cut in this end of the lever engages the projection carried by the movable strut and thus becomes rigid with the latter. As the pilot continues exerting a straining effort on the free end of the lever, the strut starts to swivel around its fixed hinged point and the bell-crank is released from the second stop so that, with a prolongation of the straining effort, the strut has a turning motion of about 90° so as to be entirely retracted in the wing or fuselage.

The hinge point of the bell-crank lever on the strut can be placed in any suitable way, but it is preferably offset with reference to the longitudinal axis of the strut, so as to lessen the overall dimension, with the upper arm of the bell-crank thus extending to either side of the longitudinal axis of the strut.

Other details and particular arrangements will become apparent on the attached drawings in which has been shown merely as an example a form of execution in accordance with the invention.

In said drawings:

Fig. 1 is a front view, partly sectional, of the upper part of the movable strut and of the control device.

Fig. 2 shows the fixed part of the device, more especially the stops.

Fig. 3 is a vertical section through the hinge point of the movable strut.

Fig. 4 is a horizontal section through the same axis.

Referring to the drawings, 2 denotes a movable strut hinged on a fixed axis 1 carried by the aircraft. This strut has a hinge point 3 offset in relation to the longitudinal axis of the strut and on which is hinged a bell-crank lever 5—8. The aircraft on the other hand carries a fixed bracket 14 to which is keyed a stationary plate 9 on which are raised two stops, respectively 10 and 11. The end of the arm 5 of the bell-crank has a shoulder 7 that, when the strut is in the landing position shown on Fig. 1 enters a position behind the stop 10, and this locks the landing-gear in the position disclosed. In this position, the mid-part of the bell-crank rests against the circular stop 11. At 16 is shown the carrier for the stationary plate 9 and at 17, 18 and 19 the means for attaching said plate to its carrier.

The free end of the arm 8 of the bell-crank is pivotally connected with the end of a rod 13, controlled by any suitable retracting device. At 22 may be observed the hinge point of the end of the rod 13 on the end of the rod 8.

In order to retract the landing gear, the rod 13 is first pulled in and this causes a swivelling motion of the bell-crank round the axis 3, while the arm 8 assumes the position 8b and the arm 5 the position 5b. In this second position, the shoulder 7 of the arm 5 has taken the position 7b in which it is released from the stop 10, while the opening 6, cut in the end of the lever 5, has assumed the position 6b. In this position, the axis 4 carried (Fig. 4) by a member 25 rigid with the strut 2, has made contact with the lower edge of the opening 6, so that, when a prolonged pull is made on the rod 13, the bell-crank moves in unison with the strut 2 and the latter begins to swivel round its axis 1, anti-clockwise. At this point, the lower edge of the shoulder 7 is free to move along the circumference 26, described around the axis 1 and the radius of which is greater than that of the circumference 24 in which is inscribed the upper edge of the stop 10. During the retraction movement, the axis 22, that first changed position along the circumference 12, described around the axis 3, moves along the circumference 20, described around the axis 1. In the position of retraction, the strut has entered the position 2a, the axis 3 the position 3a and the arms 5 and 8 of the bell-crank the positions 5a and 8a.

It should be understood that the invention is by no means confined to the example that has been described and illustrated and that inter alia the shape of the bell-crank, the position of its hinge joint with the strut, the shape of the stop and of the opening, etc., may be diversified within wide limits without going beyond the scope of the invention. Of course the device that exerts the strain on the free end of the bell-crank may be of any kind and may even be superseded by a thrust device working in the opposite direction.

What I claim is:

1. An arrangement for controlling the inward or outward travel and the locking in the landing position of a retractable undercarriage for aircraft, comprising a wheel-carrying shock absorbing leg pivotally secured to the aircraft at an intermediate point of its length, a pivotal axis carried by said leg near its upper end, a bell crank pivoted centrally to said axis, actuating means linked to one arm of the bell crank for rotating the bell crank about said pivotal axis, and the other arm being engageable with a fixed abutment on the aircraft body when the leg comes to occupy its landing position and having a lost motion connection to said leg comprising a pin engaging in an aperture, said aperture having a larger diameter than said pin, so that movement of the actuating means in one direction will first release the bell crank, and further movement thereof by said actuating means causes the leg to pivot between extended and retracted positions.

2. An arrangement for controlling the inward or outward travel and the locking in the landing position of a retractable undercarriage for aircraft, comprising a wheel-carrying shock absorbing leg pivotally secured to the aircraft at an intermediate point of its length, a pivot carried by said leg near its upper end and off-set with reference to the longitudinal axis thereof, a bell crank pivotally secured to said pivot, one arm of said bell crank being engageable with a fixed abutment on the aircraft body, and the other arm being linked to actuating means for rotating the bell crank about said pivot, said last-mentioned arm having a lost motion connection to said leg comprising a pin engaging in an aperture, said aperture having a larger diameter than said pin, whereby rotating of the bell crank by the actuating means will release the bell crank, and continued movement of the bell crank by said actuating means in one direction will pivot the leg between extended and retracted positions.

3. An arrangement for controlling the inward or outward travel and the locking in the landing position of a retractable undercarriage for aircraft, comprising a wheel-carrying leg pivotally secured to the aircraft at an intermediate point of its length, a pivot carried by said leg near its upper end, a bell crank pivotally secured to said pivot, an abutment on the aircraft body adapted to engage one arm of the bell crank when the leg is in its landing position, control means adapted to act on the other arm of the bell crank, a lost motion connection constituted by a pin engaging in an aperture and carried by the cooperating parts of the leg and of the bell crank, and a second abutment on the aircraft body forming a bearing for the central part of the bell crank when the leg is in its landing position.

4. An arrangement for controlling the inward or outward travel and the locking in the landing position of a retractable undercarriage for aircraft, comprising a wheel-carrying leg pivotally secured to the aircraft at an intermediate point of its length, a pivot carried by said leg near its upper end and offset with reference to the longitudinal axis thereof, a bell crank pivotally secured to said pivot, one arm of said bell crank being linked to actuating means for rotating said bell crank about its pivot, a lost motion connection between said leg and said bell crank comprising a pin carried by the bell crank and an aperture provided in the leg and having a larger diameter than the pin, an abutment on the aircraft body adapted to engage a shoulder at the end of the other arm of said bell crank when the leg is in its landing position, said abutment having two arcuate surfaces arranged to guide said shoulder in succession in two arcuate paths described respectively round the bell crank pivot and round the pivotal axis securing the leg to the aircraft, and a second abutment on the aircraft body having an arcuate surface forming a bearing for the central part of the bell crank when the leg is in the landing position.

RAYMOND SAULNIER.

REFERENCES CITED

The following references are of record in the file of this patent:

UNITED STATES PATENTS

| Number | Name | Date |
|---|---|---|
| 2,240,892 | Meyer | May 6, 1941 |
| 2,278,910 | Bertran | Apr. 7, 1942 |
| 2,371,699 | Martin | Mar. 20, 1945 |
| 2,411,420 | Glasgow | Nov. 19, 1946 |

FOREIGN PATENTS

| Number | Country | Date |
|---|---|---|
| 548,916 | Great Britain | Oct. 29, 1942 |